June 7, 1960     E. M. TUCKER, SR     2,939,747
TRACTOR-TRACK LINK PIN AND MOUNTING UNIT
Filed May 4, 1959
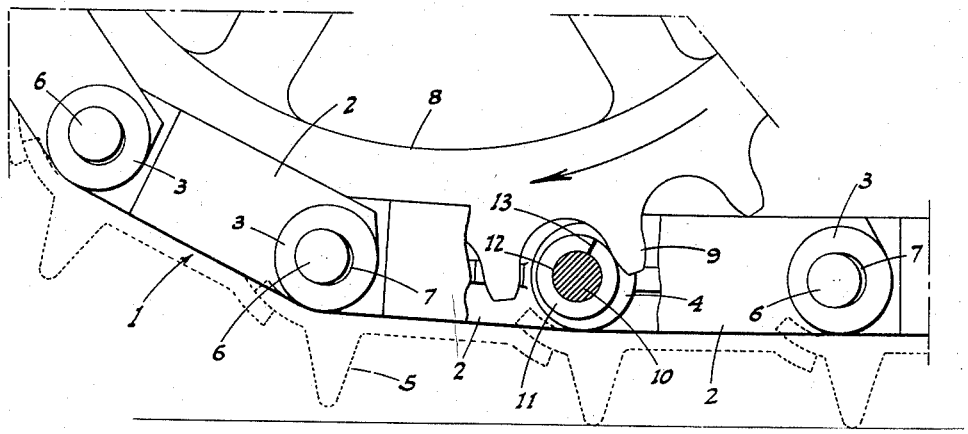
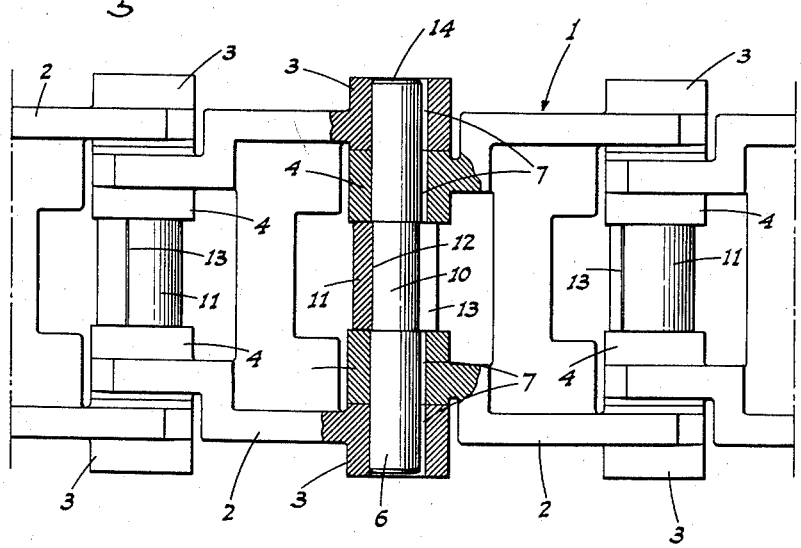
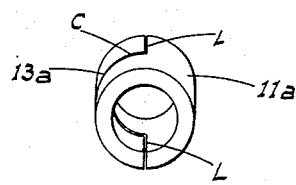
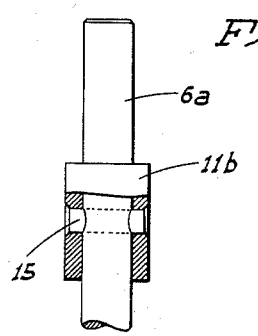
INVENTOR.
E. M. Tucker Sr.
BY
ATTYS.

United States Patent Office 2,939,747
Patented June 7, 1960

2,939,747

TRACTOR-TRACK LINK PIN AND MOUNTING UNIT

Emmitt M. Tucker, Sr., Medford, Oreg., assignor to Tucker & Sons, Grass Valley, Calif., a corporation of California Filed May 4, 1959, Ser. No. 810,777

7 Claims. (Cl. 305—57)

This invention relates in general to endless tractor-tracks, and particularly to the construction and mounting of the connecting pins of the track links.

A major object of this invention is to provide a mount for each pin in the related track links so that said pin can float, and to construct and arrange the links and pin relative to each other and to the drive sprocket about which the track is trained so that the teeth of the sprocket will engage the pins themselves to drive the track, and such teeth will impart rotation to the pins as the teeth initially engage said pins. In this manner the wear on the pins, and on their engaging bores in the track links, is distributed over the entire circumferential area of the pins and bores, and the tendency for such pins and bores to wear unevenly and become out of round is eliminated. The improved pins, mounted as they are, will therefore give many times the length of service, without undue wear, than is the case with pins as conventionally mounted.

Also, any tendency of the pin to freeze in one link or the other, because of rust or the like, is eliminated, and the pin may be more readily removed when necessary than is the case with ordinary pins and their mountings. Additionally, the floating mounting of the pin not only helps to avoid freezing of the same, but provides a self-alining feature; preventing binding of the pin in the links and misalining of the links relative to each other.

A further object of the invention is to provide the pin with an enlarged-diameter member thereon for sprocket tooth engagement, and which member also prevents axial movement of the pin in the links connected thereby. At the same time, said member—while normally rigid with the pin so that the two turn as a unit—is arranged so that the pin can be readily disengaged and removed therefrom when it is desired to disconnect the track links from each other.

It is also an object of the invention to provide a tractor-track link pin and mounting unit which is designed for ease and economy of manufacture.

Still another object of the invention is to provide a practical, reliable, and durable tractor-track link pin and mounting unit, and one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary side elevation of a tractor-track, the links of which are provided with the improved link pin; the view being partly broken out and in section and shown in connection with the track-driving sprocket.

Fig. 2 is a fragmentary top plan view of the track, partly in section, embodying such improved link pin.

Fig. 3 is a perspective view of a modified form of sprocket-engaging sleeve for the link pin.

Fig. 4 is a fragmentary view of a link pin equipped with another modified form of sprocket engaging sleeve.

Referring now to the drawings, and to the characters of reference marked thereon, and particularly at present to the arrangement and structure shown in Figs. 1 and 2, the track, indicated generally at 1, comprises—as usual—separate but cooperating links 2. These links, which may be of any generally conventional form and size, each include a pair of alined, transversely spaced bosses 3 at one end, and at the other end with similar transversely spaced bosses 4 which—when the links are coupled together—fit between and aline with the bosses 3 of an adjacent link. As is customary in tractor service, the links are formed or provided with grouser or traction lugs, indicated at 5 in Fig. 1.

A transverse pin 6 extends through bores 7 in the alined bosses 3 and 4 to pivotally connect adjacent links 2 together; said bores being elongated lengthwise of the link as clearly shown in Fig. 1, but otherwise engaging the pins with a running fit. By reason of this elongated bore arrangement, the pin—and links—will be self-alining in a transverse plane. Also, the pin is prevented from rusting or otherwise becoming frozen in the bores, and said pin will be maintained in a floating condition indefinitely.

In order to retain the pin 6 against axial movement relative to the links 2 and at the same time impart a rotative movement to the pin as the track is engaged by the driving sprocket 8 thereof, the following important arrangement is provided:

The pin 6, for the portion thereof between the bosses 4, and which is at least as long as the width of the teeth 9 of the sprocket 8, is reduced slightly in diameter, as shown at 10 in Fig. 2. The length of this reduced diameter portion 10 is the same as that of a sleeve 11 whose bore 12 is initially slightly smaller in diameter than the diameter of said reduced pin portion 10. The sleeve 11 is made of resilient steel, and is slit radially for its full length, as at 13; the resilient action tending to close the slit while the latter allows the sleeve to be spread or expanded somewhat.

When assembling the sleeve 11 on the pin 6, said sleeve is placed in the space between the link bosses 4 and the pin is then inserted through one pair of the adjacent bosses 3 and 4 and driven through the sleeve until the latter is alined with the reduced-diameter pin portion 10, and snaps into the same. The sleeve must of course be spread in order for the bore 12 thereof to pass over the relatively large main or end portion of the pin. To this end, one end of the pin is tapered, as shown at 14, sufficiently to enable said end to enter bore 12 of the sleeve and spread the same. Once the sleeve is in place in the pin, the sleeve bore 12 will grip the reduced-diameter pin portion 10; the slit 13 remaining slightly spread.

Any rotative movement imparted to the sleeve 11 will also be imparted to the pin 6; preventing resuting or freezing of the same in the link bosses. Such rotation is imparted to the pin upon the initial engagement of a sprocket tooth 9 with the sleeve, as shown in Fig. 1.

The sleeve 11 not only provides a member of a size corresponding to that of the usual link spool for engagement with the sprocket teeth, so that a standard form of sprocket may be used with my improved track and pin construction, but also prevents undesired axial displacement of the pin. Also, the relatively large size of the sleeve as compared to that of the pin gives the sprocket tooth of much greater rotating leverage on the pin than if such tooth engaged the pin directly.

Should it be necessary at any time to disconnect any track link from each other by removal of the pin, the latter may be driven lengthwise through the sleeve by exertion of sufficient sleeve-spreading pressure on one end of the pin; the difference in the diameter of portion 10 of the pin from that of the remainder of the pin being quite small in actual practice so that excessive pressure to drive the pin through the sleeve is not required.

If desired, a modified form of expansible resilient sleeve, shown at 11a in Fig. 3, may be used instead of sleeve 11. In this sleeve 11a, the slit 13a is of zigzag form, and extends lengthwise of the sleeve from the ends to the center of length in diametrally opposed relation, as shown at L; the inner ends of said longitudinal slit portions being connected by a semi-circumferential portion C. This slit arrangement will, it is felt, possible give a firmer and more evenly distributed grip of the sleeve on the pin than the first described type.

In a further modification, as in Fig. 4, the pin 6a is of constant diameter throughout its extent, and the sleeve 11b is not slit or resilient and slides onto the pin with a snug fit. The sleeve 11b and pin 6a are then secured against relative movement by a countersunk rivet 15 extending diametrally therethrough. When it is desired to remove the pin from the links, it is an easy matter to turn the pin so that an end of the rivet is exposed in a position convenient for engagement by a drive-out tool.

The same results, with respect to the rotation of the pin and the holding of the same against axial movement, is obtained by the modifications shown in Figs. 3 and 4.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a tractor-track which includes track links and a driving sprocket about which the track is trained; transversely alined bosses on the links at adjacent ends thereof, certain ones of which are spaced apart transversely to receive the teeth of the sprocket therebetween, and a pivot pin turnable in and connecting the bosses and extending across the space for engagement by a tooth of the sprocket in driving and rotating relationship.

2. A structure, as in claim 1, in which the bosses are provided with pin engaging bores elongated lengthwise of the links.

3. A structure, as in claim 1, in which the pin includes an initially separate sleeve removably secured on the pin and extending substantially the full length of the space between said certin bosses.

4. In a tractor-track structure which includes track links and a driving sprocket about which the track is trained; transversely alined bosses on the links at adjacent ends thereof, certain ones of which are spaced apart transversely to receive the teeth of the sprocket therebetween, a pivot pin turnably extending through the bosses and across said space, a sleeve on the space-crossing portion of the pin, and means removably securing the sleeve on the pin against both axial and relative rotative movement thereon.

5. A structure, as in claim 4, in which said securing means comprises a reduced-diameter portion formed in the pin along the sleeve engaged portion thereof, the sleeve being of resilient material and having a bore therethrough of a size to grippingly engage said reduced diameter portion of the pin, and the sleeve being radially slit from said bore to the periphery of said sleeve for the full length thereof; the walls of the slit being spaced apart when the bore is engaged with said reduced-diameter portion of the pin.

6. A structure, as in claim 5, in which the slit extends semi-circumferentially of the sleeve at a point substantially midway of the length thereof, from one end of the semi-circumferential portion to one end of the sleeve, and from the other end of said portion to the other end of the sleeve.

7. A structure, as in claim 4, in which said securing means comprises a countersunk rivet extending diametrally through the sleeve and pin and exposed at its opposite ends to the periphery of the sleeve.

References Cited in the file of this patent

UNITED STATES PATENTS

| 826,991 | Christ | July 24, 1906 |
| 1,300,282 | Lambert | Apr. 15, 1919 |
| 1,737,823 | Bodle | Dec. 3, 1929 |
| 2,719,063 | Dearlove | Sept. 27, 1955 |

FOREIGN PATENTS

| 128,235 | Great Britain | June 26, 1919 |